United States Patent Office.

GEORGE C. LOUIS DEGENHARDT, OF WILLIAMSBURG, NEW YORK.

Letters Patent No. 114,776, dated May 16, 1871.

IMPROVEMENT IN PURIFYING WATER FOR USE IN STEAM-BOILERS, &c.

The Schedule referred to in these Letters Patent and making part of the same.

*To all whom it may concern:*

Be it known that I, GEORGE C. LOUIS DEGENHARDT, of Williamsburg, in the county of Kings and State of New York, have invented a new and improved Process of Purifying Impure Water; and I do hereby declare that the following is a full, clear, and exact description thereof, which will enable others skilled in the art to make and use the same.

This invention has for its object to prepare water for steam-generating purposes, so that it will not be injurious to the boilers in which it is evaporated.

In many districts of the United States water is more or less impregnated with carbonate of lime and other impurities, which, when they enter steam-boilers, produce scales therein and attack the iron, so as to more or less injure the same and reduce the value and effectiveness of the boiler.

My invention consists in a new process of purifying such impure water so as to make it useful for steam-generating purposes and absolutely harmless.

To attain the stated object I treat the impure water, preferably while the same is within a feed-water heater, with diluted sulphuric acid, in such proper quantities as will insure the proper cleaning, according to the degree of impurity contained in the water.

The sulphuric acid will combine with the carbonate of lime and convert the same into sulphate of lime, which will be precipitated to let the pure water be drawn into the boiler; but even if some of the sulphate of lime should enter the boiler it will be harmless in the same, as it does not form incrustations or scales.

The test for ascertaining the purity of the water is as follows:

Blue litmus paper is used and immersed in the water to find out whether no excess of acid has been employed, and red litmus paper is used to ascertain whether there is no more carbonate of lime in the water.

Sulphate of lime is insoluble in water, (except after a great lapse of time,) while carbonate of lime is quickly soluble and soon held in perfect solution to the extent of eleven grains to each pint of water; hence, if the latter is introduced into boilers, a troublesome scale is rapidly formed upon their inside, while the former simply falls to the bottom in the shape of an impalpable powder.

Having thus described my invention,

I claim as new and desire to secure by Letters Patent—

The application, to the feed-water heater of a steam-generator, of diluted sulphuric acid, in the manner and for the purpose specified.

GEORGE C. LOUIS DEGENHARDT.

Witnesses:
 GEO. W. MABEE,
 ALEX. F. ROBERTS.